United States Patent [19]

Azuma et al.

[11] Patent Number: 5,414,523
[45] Date of Patent: May 9, 1995

[54] AUDIO SIGNAL RECORDING/REPRODUCING APPARATUS FOR RECORDING AND REPRODUCING HIGH-DEFINITION TELEVISION SYSTEM AUDIO SIGNAL OF A PLURALITY OF CHANNELS

[75] Inventors: Nobuo Azuma, Yokohama; Takashi Furuhata, Kamakura; Hiroaki Takahashi, Yokohama, all of Japan

[73] Assignee: Hitachi, Ltd., Tokyo, Japan

[21] Appl. No.: 901,134

[22] Filed: Jun. 19, 1992

[30] Foreign Application Priority Data

Jun. 21, 1991 [JP] Japan ................................ 3-150093

[51] Int. Cl.$^6$ .............................................. H04N 5/76
[52] U.S. Cl. ...................................... 358/341; 358/343; 360/19.1
[58] Field of Search ............... 358/343, 341; 360/19.1, 360/27; 369/2, 5; 398/485; H04N 5/76; 381/1, 12

[56] References Cited

U.S. PATENT DOCUMENTS

| | | | |
|---|---|---|---|
| 4,523,236 | 6/1985 | Hayashi et al. | 358/341 |
| 4,583,132 | 4/1986 | Nakano et al. | 358/341 |
| 5,124,812 | 6/1992 | Sato et al. | 358/343 |
| 5,218,454 | 6/1993 | Nagawasa et al. | 358/343 |

*Primary Examiner*—Jeffery Brier
*Assistant Examiner*—Huy Nguyen
*Attorney, Agent, or Firm*—Antonelli, Terry, Stout & Kraus

[57] ABSTRACT

An audio signal recording and/or reproducing apparatus of a magnetic recording/reproducing apparatus for recording and reproducing audio signals and a video signal. An audio control signal converting circuit is responsive to a command for selecting an arbitrary one of audio signal modes of the 3-1 system, the 2-2 system and so on to convert an input audio control signal corresponding to the input audio signal mode into a recording audio control signal corresponding to the selected audio signal mode. An audio signal processing circuit converts the input audio signals into audio signals of the selected audio signal mode in accordance with the recording audio control signal. An identification signal generating circuit generates an identification signal including the recording audio control signal. The identification signal and the converted audio signals are recorded on the magnetic tape. Upon reproduction, the audio signals and the recording audio control signal indicating the mode of the audio signals are reproduced from the magnetic tape.

19 Claims, 6 Drawing Sheets

AUDIO SIGNAL RECORDING/REPRODUCING APPARATUS FOR RECORDING AND REPRODUCING HIGH-DEFINITION TELEVISION SYSTEM AUDIO SIGNAL OF A PLURALITY OF CHANNELS

CROSS-REFERENCE TO RELATED APPLICATION

This application relates to U.S. patent application Ser. No. 07/738,470 filed Jul. 31, 1991, entitled "Audio Signal Recording and Playback Apparatus of Magnetic Recording and Playback Apparatus" by Nobuo Azuma, Takashi Furuhata, Yoshizumi Watatani, Hiroaki Takahashi and Katsumi Takeda and assigned to the same assignee of the present application.

BACKGROUND OF THE INVENTION

This invention relates to a magnetic recording/reproducing apparatus capable of recording and reproducing audio signals on a plurality of channels and a video signal, and more particularly to an audio signal recording/reproducing apparatus capable of recording and reproducing a plurality of audio signals of a high-definition television system in an easy manner of manipulation.

The rotating-head helical-scan system video tape recorder (abbreviated VTR) as a home magnetic recording/reproducing apparatus using a magnetic tape has so far been based on the NTSC system as a standard television system. However, recently the high-quality high-definition (also called Hi-Vision) television system or HDTV (High Definition TV) has been developed and is being studied for practical use. This HDTV system is described in the Journal of the Institute of Television Engineers of Japan, Vol. 44, No. 7 (1990), pp. 858-860, Chapter 6.1, "HDTV"and the HD-VTR is reported in the Journal of the Institute of Television Engineers of Japan, Vol. 44, No. 7 (1990), pp. 840-842, Chapter 4.2, "MAGNETIC RECORDING TECHNOLOGY", and Vol. 42, No. 4 (1988), pp. 338-346, Chapter 5.1, "DIGITAL VTR" (relating to digital recording VTRS including an HD-VTR).

On the other hand, for the audio signals of the high definition or Hi-Vision television system, a method (called the 3-1 system) using 4 channels (left channel L, right channel R, center channel C and back channel S) has been developed to increase the realism as described in the Journal of the Institute of Television Engineers of Japan, Vol. 44, No. 3 (1990), pp. 228-233. These audio signals of the Hi-Vision broadcast are also transmitted by the MUSE transmission system (multiple sub-Nyquist sampling encoding system). Therefore, the high-definition VTR is desired to have the capability of recording and reproducing at least 4 channel audio signals.

In the conventional audio recording and reproducing technique, for example, in the digital recording high definition VTR, 8 channels for digital audio signals are provided along the lengthwise direction of the magnetic tape. In the NTSC composite digital VTR (D2 system VTR) which is not the high definition VTR, 4 channels for digital audio signals are provided in the scanning direction of the rotating heads on areas other than the video tracks.

In other words, the conventional VTR including the NTSC and HDTV systems directly records input audio signals of 4 to 8 channels on the magnetic tape.

SUMMARY OF THE INVENTION

Since the system or mode of Hi-Vision audio signals includes many kinds of systems or modes, such as the 3-1 system which is a 4-channel stereo system, the 2-2 system which is an independent front and back stereo system (front left channel L, front right channel R, back left channel LS, back right channel RS), bilingual system, monaural system and so on, the audio information once directly recorded on the VTR as in the prior art cannot be discriminated as to the system or mode upon reproduction.

If the audio signals recorded on the magnetic tape by the 2-2 system are assumed to be of the 3-1 system and are reproduced on that basis, the center speaker emanates sound of the back left channel LS and the back speaker emanates sound of the back right channel RS.

Accordingly, it is an object of the invention to provide an audio signal recording and/or reproducing apparatus capable of always recording on the magnetic tape an audio control signal associated with information such as the kind of the system of the input audio signals or the recorded audio signals, and extracting that information upon reproduction.

It is another object of the invention to provide an audio signal recording and/or reproducing apparatus capable of transmitting the audio control signal through simple interface hardware between VTRs upon dubbing.

In order to achieve the first object of the invention, there is provided an audio signal recording and/or reproducing apparatus including control signal converting means for converting an input audio control signal corresponding to the system or mode of the input audio signals into a recording audio signal control signal corresponding to a set or selected audio signal system or mode in response to an audio signal system or mode setting command, audio signal processing means for converting the input audio signals into audio signals of the set or selected audio signal system or mode in accordance with the recording audio control signal, and identification signal generating means for generating an identification signal including the recording audio control signal, the identification signal and the converted audio signals being recorded on a magnetic tape.

Also, in order to achieve the second object, there is provided an audio signal recording and/or reproducing apparatus including input/output means for a serial audio control signal of a second transmission rate which is lower than a first transmission rate which is the transmission rate of a serial audio control signal transmitted from a Hi-Vision receiver of the MUSE transmission system, so that the interface between the input of a VTR and the output of another VTR can be simply performed by the low-transmission rate input/output means.

The input audio signals are recorded on the magnetic tape together with the audio control signal corresponding to the system or mode of the serially transmitted input audio signals. At this time, when the input audio signals are of the 4 channel stereo system and are converted or corrected into the two channel stereo system, the audio control Signal is also converted or corrected into a code corresponding to the 2-channel stereo system, and recorded on the magnetic tape.

Thus, even if the reproduced audio signals are the audio signals into which the input audio signals have been converted, the system or mode of the reproduced audio signals can be correctly discriminated, and thus the audio reproduction can be correctly performed.

The transfer rate of the audio control signal transmitted from the Hi-Vision receiver of the MUSE transmission system is as high as 1.35 Mb/s. The transmission of the audio control signal between VTRs can be performed by separately provided lower transmission rate simple hardware, or lower transmission rate audio control input/output terminals as an input/out interface provided in an audio signal recording and/or reproducing apparatus.

DESCRIPTION OF THE PREFERRED EMBODIMENTS

An embodiment of the recording section of a video and audio signal recording/reproducing apparatus of the invention will be described with reference to FIGS. 1, 3, 4 and 5.

Figure 1:
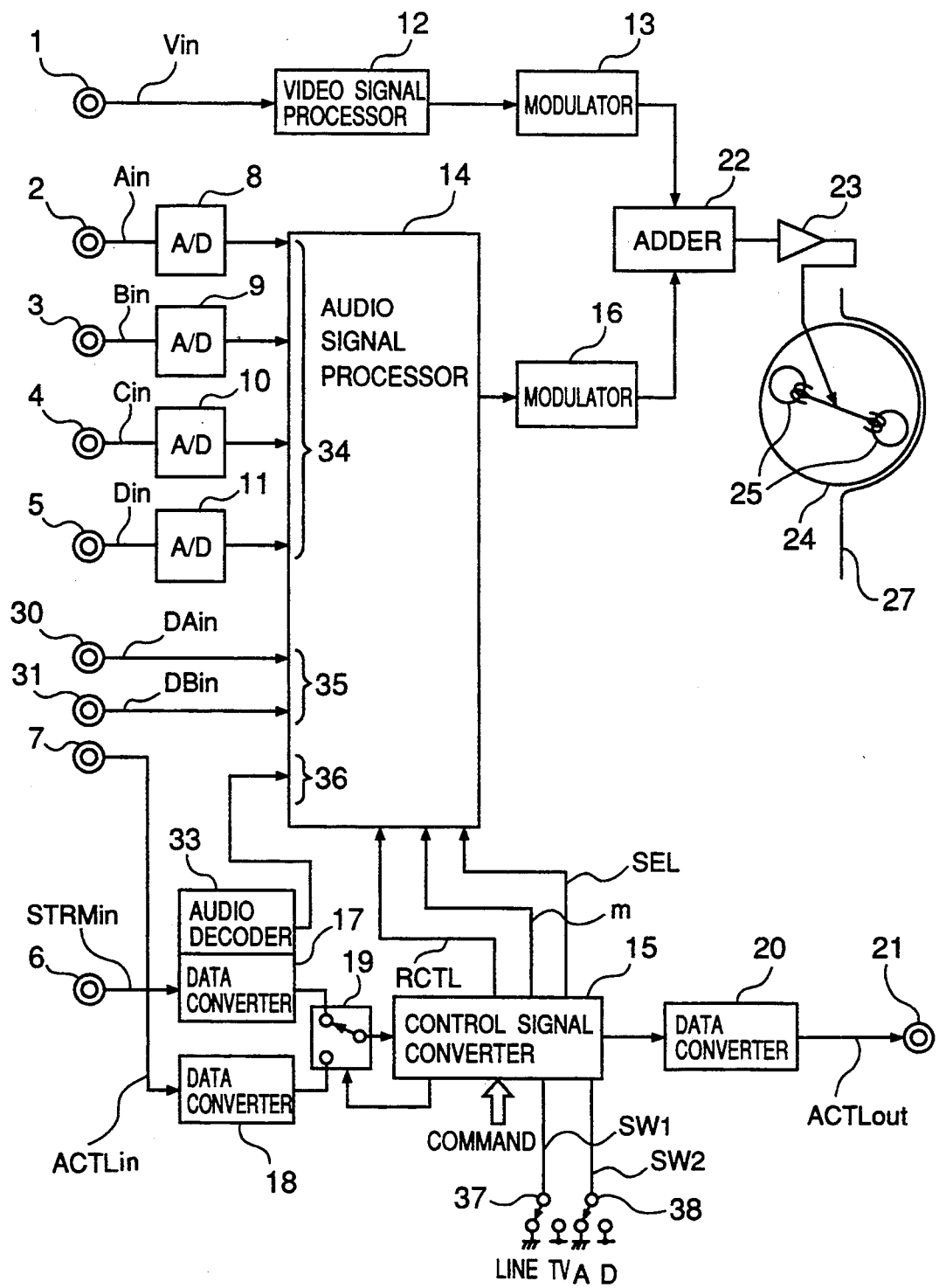
FIG. 1 is a block diagram of the recording section of a video and audio signal recording/reproducing apparatus of one embodiment of the invention.

FIG. 1 is a block diagram showing the circuit construction of the recording section of a video and audio signal recording/reproducing apparatus of one embodiment of the invention.

Referring to FIG. 1, there are shown an input terminal 1 for a video signal Vin, input terminals 2, 3, 4, 5 for audio signals Ain, Bin, Cin, Din of 4 channels, respectively, and an input terminal 6 for an audio control signal (a bit stream audio control signal of a serial transmission system for use in the MUSE transmission system which normally also includes 4 channel audio signals) STRMin corresponding to the system or mode of the audio signals Ain, Bin, Bin, Din to be recorded. In addition, there are shown an input terminal 7 for a low-transmission rate audio control signal ACTLin of a serial transmission system, A/D converters 8, 9, 10, 11 for converting analog signals into digital signals, a modulator 13, and a video signal processing circuit 12 for performing signal processing in cooperation with the modulator 13 so that the signals can be properly recorded on a magnetic tape 27. Moreover, there are shown an audio control signal converter 15 having an audio control signal conversion function, a modulator 16, and an audio signal processor 14 for performing signal processing (error correcting processing or the like) in cooperation with the modulator 16 so that the identification signal produced on the basis of the audio signals Ain, Bin, Cin, Din (here, of the base band analog form) and information transmitted from the audio control signal controller 15 can be converted into a form suitable for being recorded on the magnetic tape 27. Also, there are shown data converters 17, 18 for converting serial data of different transfer rates into parallel data, a switch 19 for selecting either one of STRMin and ACTLin, a data converter 20 (which may be formed of, for example, the general purpose "8251" IC) for converting the audio control signal (parallel data) produced from the audio control signal converter 15 into the audio control signal ACTLout of serial data, and an output terminal 21 for the ACTLout produced from the VTR which, in this embodiment, is assumed to have the same transmission rate as ACTLin. In addition, there are shown an adder 22, a recording amplifier 23, a rotating drum 24, rotating heads 25, digital input terminals 30, 31 (through which DAin and DBin can be transmitted on two channels) of a digital audio interface of the EIAJ standard CP 340 which is widely used in CD players or the like as a digital interface, an audio decoder 33 (the data converter 17 and the decoder 33 are sometimes integrated as a single IC) for extracting the digital audio signals from STRMin when it includes the audio signals and audio control signal, it being noted that the audio control signal can be simultaneously transmitted on STRMin a switch 37 for selecting either one of a LINE input and a TV input and producing a signal SW1 reflecting the result of the selection, and a switch 38 for selecting an analog form or a digital form of the input audio signals as an example of the command to the converter 15, and producing a signal SW2 reflecting the result of the selection to control the signal SEL.

The audio signal processor 14 includes a converter for converting, for example, 4 channel audio signals into 2 channel audio signals. The data converter 20 includes at least one of a converter for converting the control signal included in the input STRMin signal at the input terminal 6 into serial data with the transmission rate unchanged, and a converter for converting it into serial data of a lower transmission rate than the above transmission rate.

Figure 3:
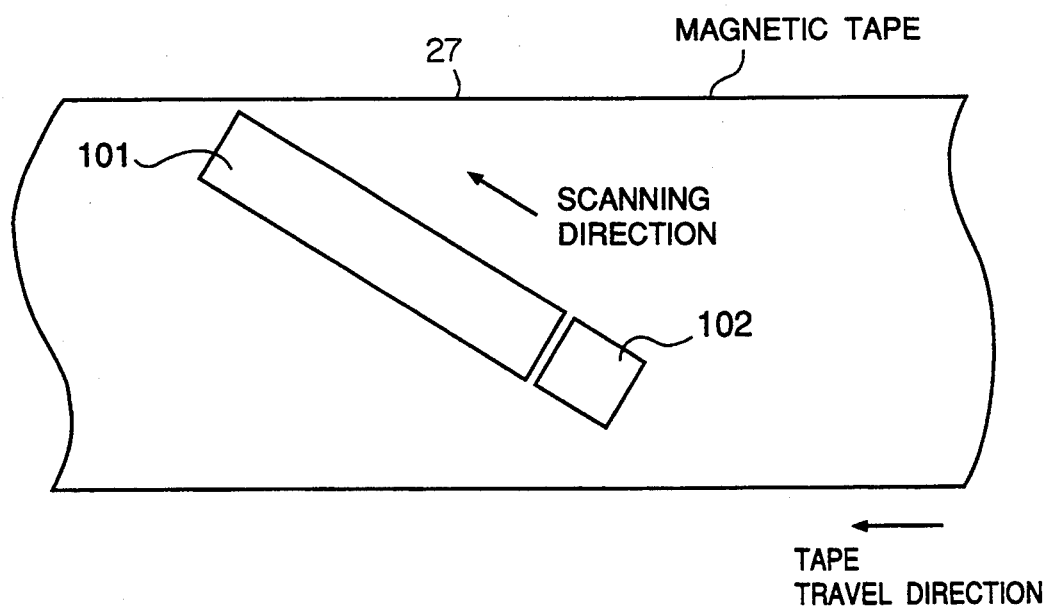
FIG. 3 shows an example of the recorded pattern on the tape.

FIG. 3 shows a tape pattern recorded on the magnetic tape 27. The video signal and the audio signals are supplied through the adder 22 and recording amplifier 23 to the rotating heads 25, by which they are recorded on a recording area (video track) 101 and an audio signal recording area 102 on the magnetic tape 27, respectively.

While in this embodiment the video signal and the audio signals are simultaneously recorded on separate areas in a time sharing manner by two heads so as to form a one-channel recorded pattern, four heads may be used so that a 2 channel recorded pattern can be formed, if necessary.

Also, while a single audio signal area 102 is provided in each track, two audio signal areas may be provided on each track.

In addition, while the input video signal Vin, audio signals Ain, Bin, Cin, Din and audio control signal are produced from the HI-Vision receiver (including the tuner and MUSE decoder) which receives MUSE broadcasts, they may be produced from a Hi-Vision camera and a microphone.

Figure 4:
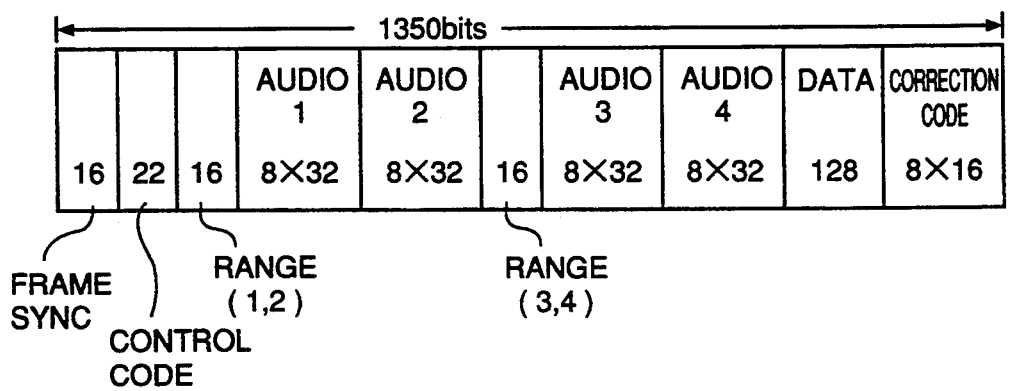
FIG. 4 is a diagram useful for explaining the bit stream audio control signal.
Figure 5:
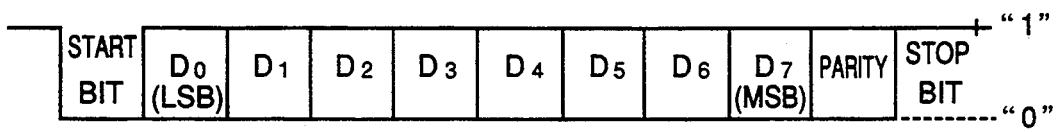
FIG. 5 is a diagram useful for explaining the serial transmission system signal.

FIG. 4 shows the frame bit-assignment format of the bit stream audio control signal STRMin(including audio signals) corresponding to the system of audio signals. This shows an example of A-mode in which signals are transmitted on 4 channels. One frame is formed of 1350 bits, and the transfer bit rate is 1.35 Mb/s. One frame includes 16 bits for frame synchronization, 16 bits for compression or expansion as range bits, or a total of 32 bits therefor, 22 bits for a control code which is the source of the audio control signal, audios 1 to 4 and a correction code and so forth. The information indicating the system of the audio signals is in most cases included in 6 or 7 bits of the 22 bit control code. This information of 6 or 7 bits is used for the audio control signal ACTLout between VTRs. The STRMin can be of course directly used as the audio control signal between VTRs. Since this STRMin is transmitted at a high transmission rate of 1.35 Mb/s, the hardware scale of the interface circuit is increased. Thus, in this embodiment, the control signal converter 15 generates the audio control signal of 8-bit information as shown in FIG. 5 (when it is 6 bits as above, two bits are used as spare bits) and, if necessary, the data converter 20 converts it into a serial-transmission signal of low transmission rate (for example, 38.4 Kb/s ), which is used for interface. The bit-assignment format of this low transmission rate signal is shown in FIG. 5. This format is generally used and known as RS232C, making the interface circuit simple.

The recording operation will be described with reference to FIGS. 1, 3, 4 and 5. The audio control converter 15 is supplied with a command for mode setting or the like from the system control of the VTR (not shown). When an analog input group 34 is selected which is supplied to the input terminals 2 to 5 from the Hi-Vision receiver, the switch 37 is switched to the left LINE-side position, and the switch 38 is switched to the left A(analog)-side position, so that the signal SEL is supplied to the audio signal processor 14. The switch 19 is switched to the upper position, thus allowing the bit stream audio control signal STRMin indicating the mode of transmission mode, stereo, monaural or the like to be fed through the terminal 6 through the switch 19 to the controller 15.

When the input audio signals are directly recorded in accordance with the audio signal mode setting command from the operator, the signal STRMin is not changed and is supplied from the converter 15 as the recording control signal RCTL to the audio signal processing circuit 14. When the input audio signals are converted, for example, from the 3-1 system to the 2-2 system by the audio signal processor 14 before being recorded, the signal STRMin is converted into that system (for example, the 2-2 system) as RCTL. This RCTL and an audio recording mode command m (not the mode of the input audio signals, but a command, for example, to set the sampling frequency to the 32 kHz mode or 48 kHz mode when the signals are recorded on the magnetic tape) are supplied to the audio signal processor 14. The audio signal processor 14 generates an identification (ID) signal on the basis of the RCTL and m and supplies it through the modulator 16, adder 22, and amplifier 23 to the magnetic heads 25 by which it is recorded on the area 102 (FIG. 3) of the magnetic tape. In this case, on this area 102 there are recorded signals of 4 channels in the 32 kHz mode or high quality 2 channels in the 48 kHz mode. This ID signal is generally used for audio control when the audio signals are recorded in a digital manner. One example of this case is described in the Journal of the Institute of Television Engineers of Japan, Vol. 42, No. 4 (1988), pp. 347–350, Chapter 5-2, "DIGITAL AUDIO TAPE RECORDER".

During recording, parallel data corresponding to RCTL is converted into serial data of low transmission rate by the data converter 20, and then supplied from the VTR through the terminal 21 as the audio control signal ACTLout of the format shown in FIG. 5.

When a digital input group 35 is selected which is the external input at the digital input terminals 30, 31, the switch 37 is switched to the LINE-side position, and the switch 38 is switched to the right D(digital)-side position. In this case, the audio control signal ACTLin should be used by pairing the digital input terminals 30, 31 and ACTLin input terminal 7. When the bit stream STRMin from a television receiver through the input terminal includes audio signals, the switch 37 is switched to the TV (television)-side (TV recording) position (at this time, the switch 38 is ineffective), selecting the STRMin so that the audio signals and the audio control signal can be derived from the single STRMin signal. This STRMin may be used as the audio control signal from the output of the VTR. In this case, the input and output interface for the audio signals and the audio control signal can be effected by a single STRMin interface, and the audio control signal input and output terminals of low transmission rate may be omitted.

Figure 2:
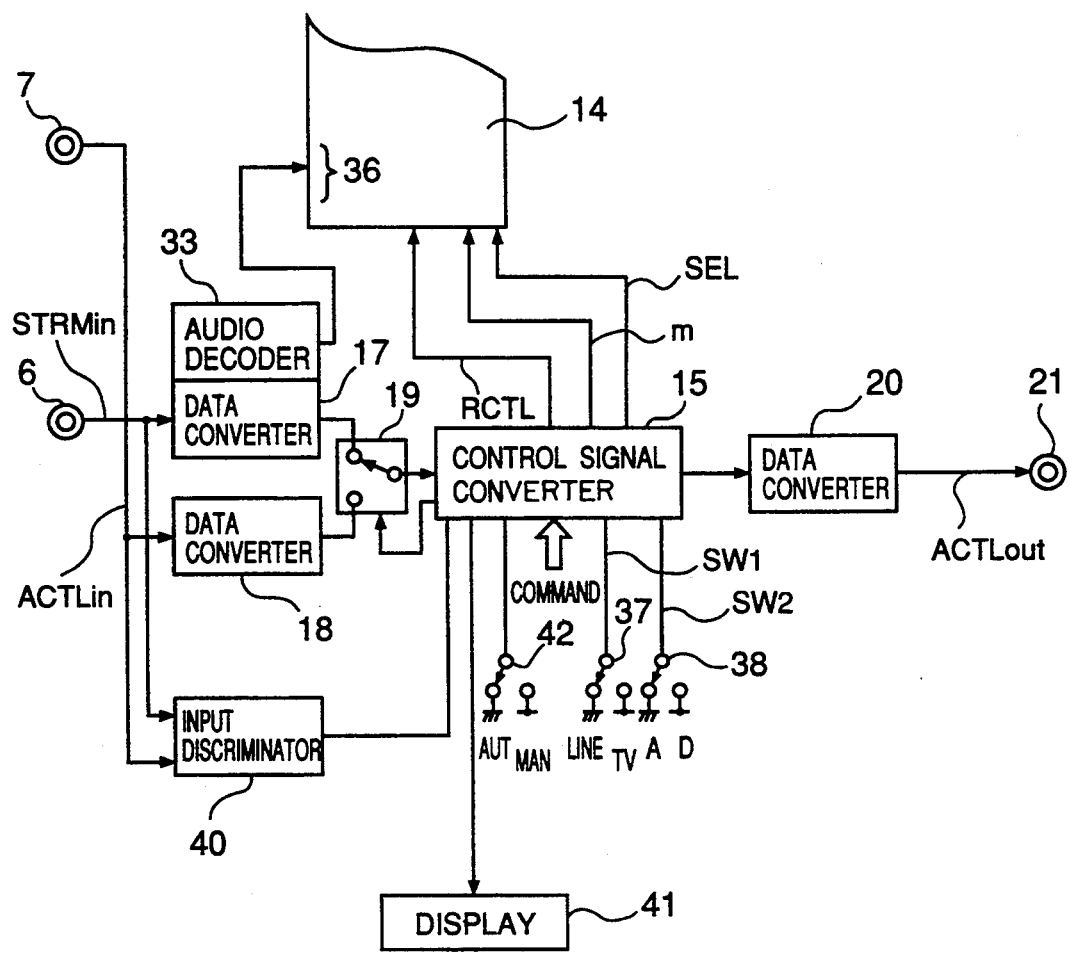
FIG. 2 is a block diagram of the recording section of a video and audio signal recording/reproducing apparatus of another embodiment of the invention.

FIG. 2 is a block diagram of another embodiment of the recording section of the video and audio recording-/reproducing apparatus of the invention.

The case in which the audio control signal is supplied to both input terminals 6 and 7 will be described with reference to FIG. 2. When the audio control signal is supplied to either one of the terminals, the audio control signal thereto is preferentially selected. Referring to FIG. 2, there are shown an input discriminator 40 for deciding whether the signal is supplied to the input terminals 6 and 7, a display 41 for indicating the situation in which the audio control signal is supplied to the input terminals or not, and a switch 42 for instructing AUTO and MANUAL. The other elements are the same as in FIG. 1. If the switch SW 42 is in the left AUTO position and the signal is not supplied to either of the input terminals 6 and 7 (including no signal under connection to the terminals), the controller 15 controls the display 41 to indicate the input situation, alarming the user. When there is no response from the user, all bits of RCTL, for instance, are cleared to be "0". The user can change the switch SW 42 to the right MANUAL-side position, and select the mode of the input audio signals, providing it to RCTL.

When the signal is supplied to both the input terminals 6 and 7, the display 41 indicates this situation, and the user can select either one by operating the switch 19.

Figure 7:
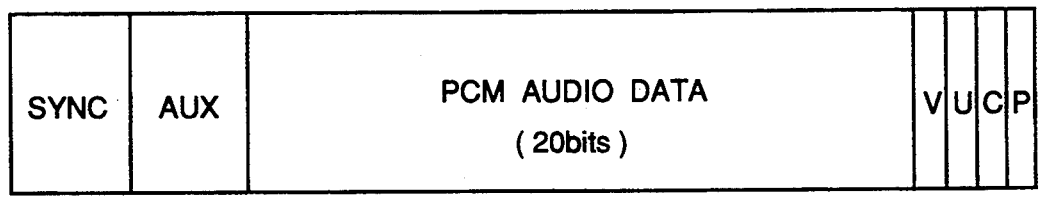
FIG. 7 is a diagram useful for explaining the digital input/output interface.

FIG. 7 shows the bit-assignment format of a subframe for explaining the format of the CP340 standard of DAin, DBin in FIG. 1. One subframe is formed of a total of 32 bits of 4 bits for SYNC, 4 bits for AUX, 20 bits for PCM audio data (L channel or R channel), 1 bit for a parity flag V, 1 bit for a user bit U, 1 bit for a channel status C and 1 bit for a parity bit P. If necessary, the information of the audio control signal RCTL can be transmitted on the CP340 digital interface at the AUX or user bit U shown in FIG. 7.

Figure 6:
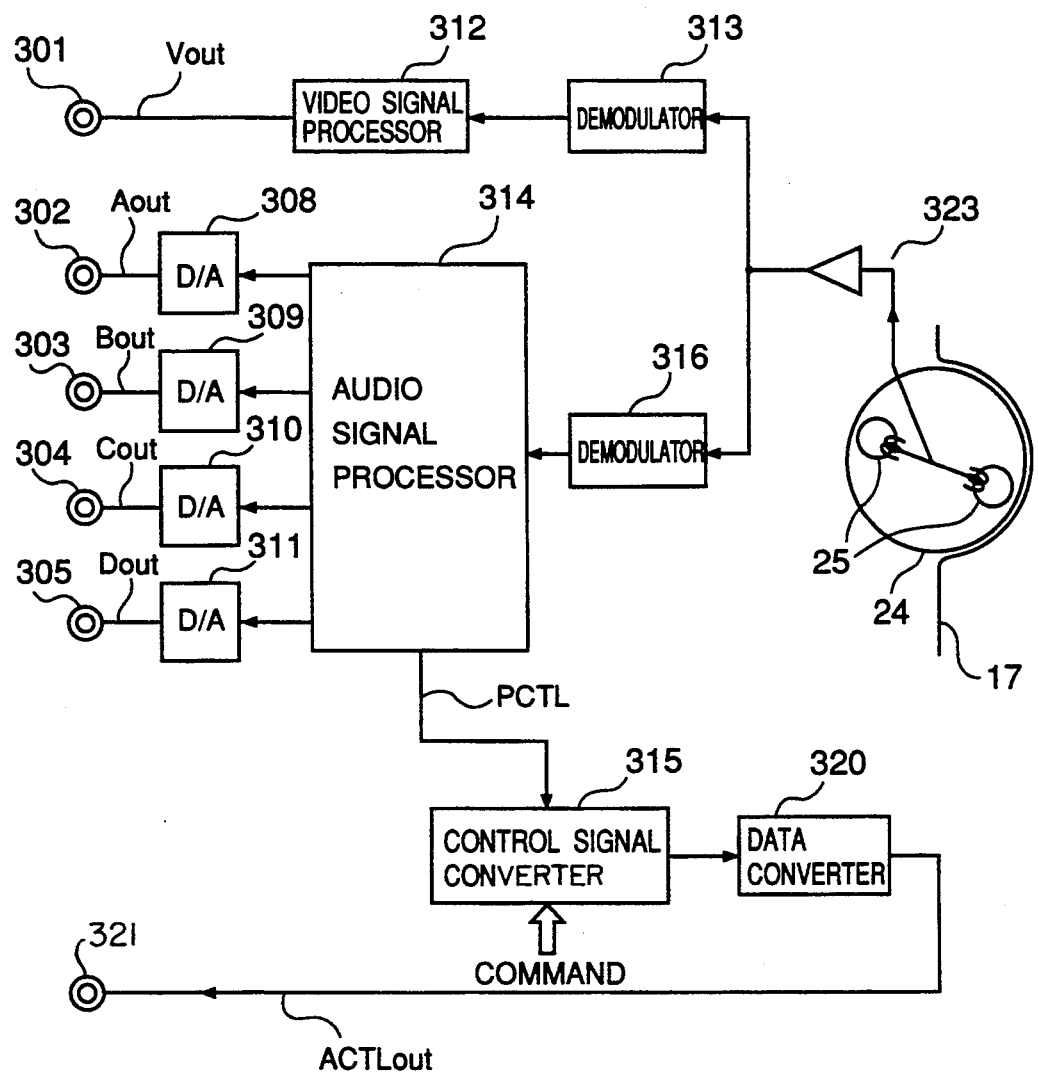
FIG. 6 is a block diagram of the reproducing section of the video and audio recording/reproducing apparatus of the second embodiment of the invention referred to above.

FIG. 6 is a block diagram of one embodiment of the reproducing section of the video and audio recording-/reproducing apparatus of the invention. The reproducing operation will be described with reference to FIG. 6. Like elements corresponding to those in FIG. 1 are identified by the same reference numerals (in the following figures, like elements are identified by the same reference numerals).

Referring to FIG. 6, there are shown output terminals 301 to 305 associated with the input signals shown in FIG. 1. Namely, the output Vout corresponds to Vin, and the outputs Aout to Dout correspond to audio signals Ain to Din, respectively. Only the analog output group will be mentioned below. There are also shown D/A converters 308 to 311 for converting the digital signals into analog signals, a video signal processor 312, a preamplifier 323, and a demodulator 313. The signal reproduced from the rotating heads 25 is supplied through the preamplifier 323 and the demodulator 313 to the video signal processor 312, where it is restored to a based band video signal. Moreover, there are shown an audio signal processor 314 for performing error correction and decoding and a demodulator 316. The reproduced signal from the preamplifier 323 is supplied through the demodulator 316 to the audio signal processor 314, where it is restored to a base band digital signal. In addition, there are shown an audio control signal converter 315 and a data converter (parallel/serial converter) 320 which is provided as required.

The reproducing operation will be described below. The reproduced signal from the rotating heads 25 is supplied through the preamplifier 323 and demodulator 316 to the audio signal processor 314, where the audio signals are converted into base band digital signals. The digital signals are converted into analog signals by the D/A converters 308 to 311, and produced at the output terminals 302 to 305. The ID signal previously stored in the audio signal processor 314 is extracted, and only the audio control signal corresponding to the system of audio signals is detected as a PCTL signal from the ID signal. This audio control signal PCTL is supplied to the audio control signal converter 315, where parallel data is derived. The parallel data is converted into serial data of low bit rate (here, 38.4 Kb/s) by the data converter 320 and then produced at the terminal 321 as the audio control signal ACTLout from the VTR. Therefore, for dubbing between VTRs, this low bit rate signal may be use for interfacing. Alternatively, the data converter 320 may act as a serial data converter for the MUSE system bit rate, and also may include converters for both bit rates.

As described above, since the audio control signal indicative of the mode of the finally recorded audio signals is recorded on the magnetic tape, the mode of the audio information reproduced can be detected. Thus, correct reproduction can be automatically performed by use of the audio control signal produced from the VTR as will be described below.

Figure 8:
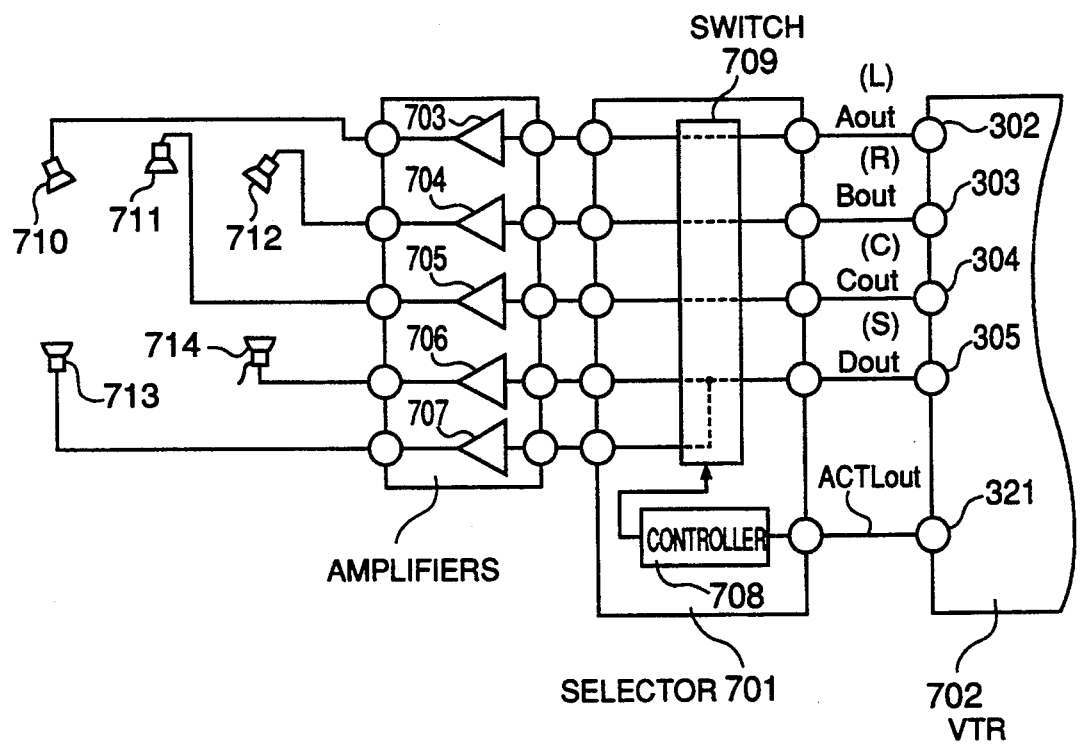
FIGS. 8 and 9 are diagrams useful for explaining the reproducing mode for various systems of 4 channel audio signals.

FIG. 8 is a diagram useful for explaining the reproduction of the audio signals in a VTR 702 of the invention. The signals are of the 3-1 system (in which L, R, C and S signals are used as input signals, and the audio control signal ACTLout includes information that the input signals are of the 3-1 system) out of various systems such as the 3-1 system, the 2-2 system, the bilingual system and so on. The signals are reproduced through a selector (which may be provided within the VTR) 701 and speakers 710 to 714. Shown at 710, 711, 712, 713 and 714 are left, center, right, left back and right back speakers, 703 to 707 amplifiers for driving those speakers, and 708 a controller which receives ACTLout and produces a signal for controlling a switch 709. When the 4 channel audio signals recorded in the 3-1 system are reproduced by the magnetic recording/reproducing apparatus, the signals of L, R, C, and S are produced from Aout, Bout, Cout and Dout. ACTLout includes the information that the signals are of the 3-1 system. ACTLout is discriminated by the controller 708, and the controller 708 connects a switch 709 as indicated by the broken lines. As a result, the signals of L, C, R, S, S of the correct 3-1 system are reproduced from the speakers 710, 711, 712, 713 and 714.

Figure 9:
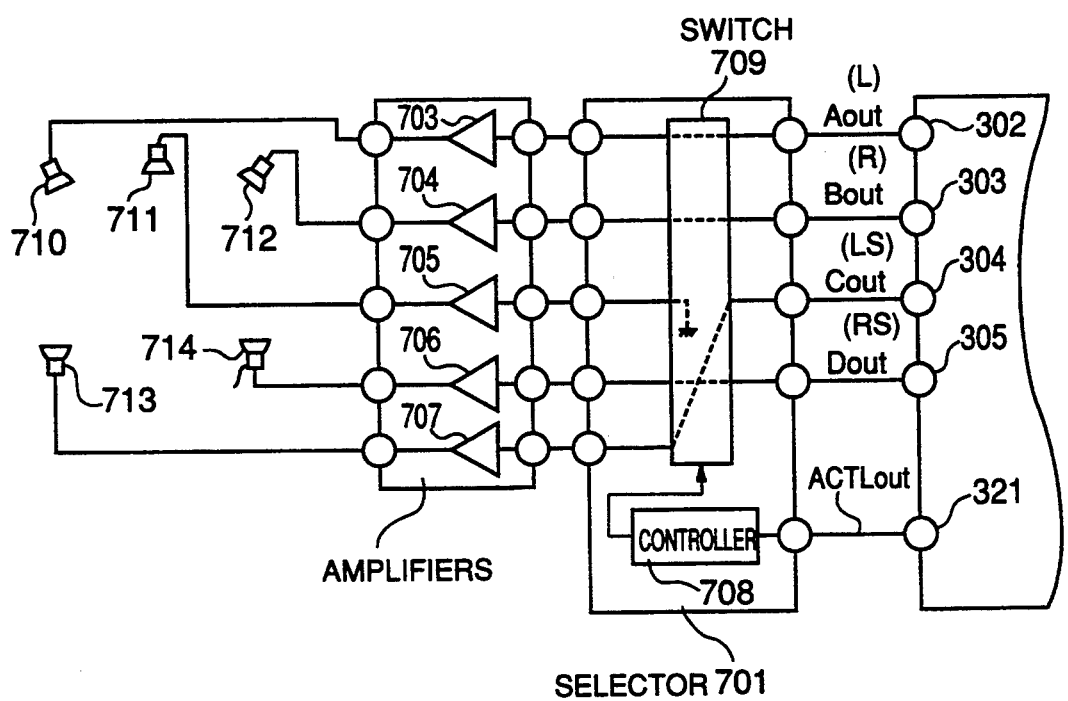

The reproduction of the 2-2 system recorded signal will be described with reference to FIG. 9. Only the state of the switch 709 is different from that in FIG. 8. When the 4 channel signals recorded in the 2-2 system are reproduced by the VTR 702, signals of L, R, LS (left back surround signal) and RS (right back surround signal) are produced from Aout, Bout, Cout and Dour, respectively. ACTLout includes information indicative of the 2-2 system. This information is discriminated by the controller 708, and the switch 709 is changed in its position as indicated by the broken lines in FIG. 9. Thus, the speakers 710, 711, 712, 713, 714 reproduce (in the 2-2 system,) non-signal, R, LS and RS. For the bilingual system, the same operation can be performed.

An example of the conversion of the 3-1 system into a pseudo 2-2 system will be described below. The signals of L, R of the 3-1 system are somewhat different from the conventionally used stereo left and right channel signals. When the conventionally used stereo left and right channels are represented by L' and R', the conversion can be made as $L'=L+0.7C+0.7S$, $R'=R+0.7C+0.7S$. Thus, when L, R, C and S are fed to Ain, Bin, Cin and Din, respectively, they are converted into L', R', S, and S(or they may into L', R', C, and S) by the audio signal processing circuit 14 in accordance with a command. The audio control signal RCTL is convert into that of the 2-2 system. These signals are recorded on the magnetic tape. When the signals are converted into L', R', C and S, the information indicative of "the system is the 3-3 system and L and R have been converted into L' and R'" may be added to RCTL. In this case, even when the center speaker 711 in FIG. 9 is not used, natural sound of the 2-2 system can be enjoyed.

When a command is sent to the control signal converter 15 in FIG. 1 ordering that the 4 channel input audio signals of the 3-1 system be recorded in the high-quality 48 kHz mode, L' and R' are conveniently produced from L, R, C and S in a similar manner, and dubbed on the VTR which can record only two channel signals.

Thus, according to this invention, even if the input signals are converted or corrected before being recorded, the mode of the input audio signals after conversion is correctly recorded as the audio control signal on the magnetic tape, and hence upon reproduction the mode can be correctly discriminated so that correct audio reproduction can be performed.

Moreover, since the audio control signal of low speed transmission serial mode can be transmitted between VTRs, if necessary, the interface for the audio control signal can be achieved by simple hardware.

What is claimed is:

1. An audio signal recording apparatus for a magnetic recording/reproducing apparatus, the magnetic recording/reproducing apparatus being capable of recording and reproducing a video signal and audio signals and producing a command indicative of a desired recording audio signal mode, the audio signal recording apparatus comprising:

input audio signal terminal means for receiving input audio signals of a plurality of channels of an input audio signal mode;

input audio control signal terminal means for receiving an input audio control signal corresponding to the input audio signal mode;

audio control signal converting means, responsive to the command indicative of the desired recording audio signal mode, for converting the input audio control signal into a recording audio control signal indicative of the desired recording audio signal mode;

audio signal processing means, responsive to the recording audio control signal, for converting the input audio signals into recording audio signals of the desired recording audio signal mode indicated by the recording audio control signal;

identification signal generating means for generating an identification signal for use in reproducing the recording audio signals from a magnetic tape after the recording audio signals have been recorded on the magnetic tape, the identification signal including information from the recording audio control signal; and recording means for recording the recording audio signals and the identification signal on the magnetic tape.

2. An audio signal recording apparatus according to claim 1, wherein the input audio control signal includes part of an audio control signal in a serial bit stream audio signal for an MUSE transmission system.

3. An audio signal recording apparatus according to claim 1, wherein the input audio signals are input audio signals of not more than four channels; and wherein the audio signal processing means includes means for converting input audio signals of four channels into recording audio signals of two channels.

4. An audio signal recording apparatus according to claim 1, wherein the input audio signal terminal means includes analog input audio signal terminal means for receiving analog input audio signals, and digital input audio signal terminal means for receiving digital input audio signals; and wherein the audio signal processing means includes first selecting means for selecting one of (1) the analog input audio signals and (2) the digital input audio signals, and converting means for converting the selected one of the analog input audio signals and the digital input audio signals into the recording audio signals.

5. An audio signal recording apparatus according to claim 4, wherein the digital input audio signal terminal means includes a serial bit stream interface terminal for an MUSE transmission system.

6. An audio signal recording apparatus according to claim 4, wherein the digital input audio signal terminal means includes a serial digital audio interface terminal.

7. An audio signal recording apparatus according to claim 4, wherein the digital input audio signal terminal means includes a serial bit stream interface terminal for an MUSE transmission system for receiving a serial bit stream audio signal including first digital input audio signals, and a serial digital audio interface terminal for receiving second digital input audio signals; and wherein the audio signal processing means further includes second selecting means for selecting one of (1) the first digital input audio signals and (2) the second digital input audio signals, and supplying the selected one of the first digital input audio signals and the second digital input audio signals to the first selecting means.

8. An audio signal recording apparatus according to claim 1, further comprising converting means for converting the recording audio control signal into serial data having a transmission rate lower than a transmission rate of the input audio control signal, and outputting the serial data.

9. An audio signal recording apparatus according to claim 1, wherein the input audio control signal terminal means includes first terminal means for receiving a serial bit stream audio signal for an MUSE transmission system, the serial bit stream audio signal including a first input audio control signal, and second terminal means for receiving a second input audio control signal having a transmission rate lower than a transmission rate of the serial bit stream audio signal; and wherein the audio signal recording apparatus further comprises:

discriminating means for discriminating whether or not the first terminal means is receiving the serial bit stream audio signal and whether or not the second terminal means is receiving the second input audio control signal, and producing an output indicative of a result of the discriminating; and selecting means for selecting one of the first input audio control signal and the second input audio control signal based on the output of the discriminating means, and supplying the selected one of the first input audio control signal and the second input audio control signal to the audio control signal converting means.

10. An audio signal recording apparatus according to claim 9, further comprising display means for displaying the result of the discriminating based on the output of the discriminating means.

11. An audio signal recording apparatus according claim 1, wherein the identification signal generating means generates the identification signal based on the recording audio control signal and an audio recording mode command indicative of a desired sampling frequency for the recording audio signals, the audio recording mode command being produced by the audio control signal converting means.

12. An audio signal recording apparatus for a magnetic recording/reproducing apparatus, the magnetic recording/reproducing apparatus being capable of recording and reproducing a video signal and audio signals and producing a command indicative of a desired recording audio signal mode, the audio signal recording apparatus comprising:

first input terminal means for receiving a bit stream audio signal for an MUSE transmission system, the bit stream audio signal including first input audio signals of a plurality of channels of an input audio signal mode, and an input audio control signal corresponding to the input audio signal mode;

audio control signal converting means, responsive to the command indicative of the desired recording audio signal mode, for converting the input audio control signal into a recording audio control signal indicative of the desired recording audio signal mode;

audio signal processing means, responsive to the recording audio control signal, for converting the first input audio signals into recording audio signals of the desired recording audio signal mode indicated by the recording audio control signal;

identification signal generating means for generating an identification signal for use in reproducing the recording audio signals from a magnetic tape after the recording audio signals have been recorded on the magnetic tape, the identification signal including information from the recording audio control signal; and recording means for recording the recording audio signals and the identification signal on the magnetic tape.

13. An audio signal recording apparatus according to claim 12, further comprising second input terminal means for receiving second input audio signals of a plurality of channels;

wherein the audio signal processing means includes selecting means for selecting one of (1) the first input audio signals and (2) the second input audio signals, and converting means for converting the selected one of the first input audio signals and the second input audio signals into the recording audio signals.

14. An audio signal recording/reproducing apparatus for a magnetic recording/reproducing apparatus, the magnetic recording/reproducing apparatus being capable of recording and reproducing a video signal and audio signals and producing a command indicative of a desired recording audio signal mode, the audio signal recording/reproducing apparatus comprising:

input audio signal terminal means for receiving input audio signals of a plurality of channels of an input audio signal mode;

input audio control signal terminal means for receiving an input audio control signal corresponding to the input audio signal mode;

audio control signal converting means, responsive to the command indicative of the desired recording audio signal mode, for converting the input audio control signal into a recording audio control signal indicative of the desired recording audio signal mode;

audio signal processing means, responsive to the recording audio control signal, for converting the input audio signals into recording audio signals of the desired recording audio signal mode indicated by the recording audio control signal;

identification signal generating means for generating an identification signal for use in reproducing the recording audio signals from a magnetic tape after the recording audio signals have been recorded on the magnetic tape, the identification signal including information from the recording audio control signal;

recording means for recording the recording audio signals and the identification signal on the magnetic tape;

identification signal reproducing means for reproducing the identification signal from the magnetic tape;

detecting means for detecting, from the reproduced identification signal, the information from the recording audio control signal, and outputting the detected information as parallel data; and parallel/serial converting means for converting the parallel data into serial data for use in outputting the recording audio signals after the recording audio signals have been reproduced from the magnetic tape, and outputting the serial data.

15. An audio signal recording/reproducing apparatus according to claim 14, wherein the parallel/serial converting means includes means for converting the parallel data into serial data having a transmission rate lower than a transmission rate of a serial bit stream audio signal for an MUSE transmission system.

16. An audio signal recording/reproducing apparatus according to claim 14, further comprising:

recording audio signal reproducing means, responsive to the identification signal, for reproducing the recording audio signals from the magnetic tape in accordance with the identification signal; and output means, responsive to the serial data, for outputting the reproduced recording audio signals in accordance with the serial data.

17. An audio signal recording/reproducing apparatus according to claim 14, wherein the input audio control signal terminal means includes at least one of first terminal means for receiving a first serial input audio control signal having a first transmission rate, and second terminal means for receiving a second serial input audio control signal having a second transmission rate lower than the first transmission rate; and wherein the parallel/serial converting means includes at least one of first converting means for converting the parallel data into serial data having the first transmission rate, and second converting means for converting the parallel data into serial data having the second transmission rate.

18. An audio signal recording/reproducing apparatus according to claim 17, wherein the input audio control signal terminal means includes the first terminal means and the second terminal means; and wherein the audio signal recording/reproducing apparatus further comprises:

discriminating means for discriminating whether or not the first terminal means is receiving the first serial input audio control signal and whether or not the second terminal means is receiving the second serial input audio control signal, and producing an output indicative of a result of the discriminating; and selecting means for selecting one of the first serial input audio control signal and the second serial input audio control signal based on the output of the discriminating means, and supplying the selected one of the first serial input audio control signal and the second serial input audio control signal to the audio control signal converting means.

19. An audio signal recording/reproducing apparatus according to claim 18, further comprising display means for displaying the result of the discriminating based on the output of the discriminating means.

* * * * *